United States Patent [19]
Saito et al.

[11] Patent Number: 5,449,711
[45] Date of Patent: Sep. 12, 1995

[54] OLEFINIC THERMOPLASTIC ELASTOMER COMPOSITION

[75] Inventors: Nobuo Saito, Narita; Yoshihiro Shigemori, Koshigaya; Mitsuo Noda, Chiba; Jun-ichi Itou, Narita, all of Japan

[73] Assignee: Dainichiseika Color & Chemicals Mfg. Co., Ltd., Tokyo, Japan

[21] Appl. No.: 44,512

[22] Filed: Apr. 7, 1993

[30] Foreign Application Priority Data

Apr. 7, 1992 [JP] Japan .................................. 4-114116

[51] Int. Cl.$^6$ ................................................ C08K 5/05
[52] U.S. Cl. .................................. 524/224; 524/222; 524/232; 524/247; 524/284; 524/300; 524/322; 524/381; 524/385; 524/251; 524/388
[58] Field of Search ............... 524/222, 224, 232, 247, 524/284, 300, 322, 381, 385, 388, 251

[56] References Cited

U.S. PATENT DOCUMENTS

| | | | |
|---|---|---|---|
| 3,496,135 | 2/1970 | Caywood, Jr. | 524/251 |
| 3,546,161 | 12/1970 | Wolheim | 524/251 |
| 3,988,227 | 10/1976 | Eldred | 204/159.17 |
| 4,082,877 | 4/1978 | Shadle | 428/35 |
| 4,212,787 | 7/1980 | Matsuda et al. | 260/33.6 AQ |
| 4,239,862 | 12/1980 | Mathews et al. | 525/240 |
| 4,247,652 | 1/1981 | Matsuda et al. | 521/95 |
| 4,619,859 | 10/1986 | Yoshimura et al. | 428/213 |
| 4,818,785 | 4/1989 | Otawa et al. | 524/536 |
| 4,820,774 | 4/1989 | Takao et al. | 525/208 |
| 4,839,429 | 6/1989 | Tajima | 525/232 |
| 4,925,898 | 5/1990 | Itokazu et al. | 525/305 |
| 5,010,139 | 4/1991 | Yu | 524/397 |
| 5,187,224 | 2/1993 | Hamanaka et al. | 524/505 |

FOREIGN PATENT DOCUMENTS

| | | |
|---|---|---|
| 1-014023 | of 0000 | Japan . |
| 56-015743 | of 0000 | Japan . |
| 3-025346 | of 0000 | Japan . |
| 2-037942 | of 0000 | Japan . |

*Primary Examiner*—Edward Cain
*Attorney, Agent, or Firm*—Millen, White, Zelano & Branigan

[57] ABSTRACT

Blooming on the surface of products molded from an olefinic thermoplastic elastomer composition containing an olefinic thermoplastic elastomer and one or more additives which promotes such blooming is prevented by compounding into the elastomer one or more compounds selected from the group consisting of esters of polyhydric alcohols, alkylalkanolamines, alkylalkanolamides, fatty acid amides, higher alcohols, aliphatic amines, fatty acids and adducts of alkylene oxides to these compounds. The composition thus can be advantageously used as interior materials of automobiles and materials for electronic instruments.

17 Claims, No Drawings

OLEFINIC THERMOPLASTIC ELASTOMER COMPOSITION

BACKGROUND OF THE INVENTION

1. Field of the invention

The present invention relates to a novel olefinic thermoplastic elastomer composition. More particularly, it relates to an olefinic thermoplastic elastomer composition having excellent property to prevent blooming of various kinds of additives on the surface of molded products and useful in the fields of automobiles and light electrical appliances.

2. Description of the prior art

Olefinic thermoplastic elastomers are composite materials made by blending of rubbers comprising the hard segment of a polyolefinic plastic, such as polyethylene, polypropylene and the like, and the soft segment of an ethylenic elastomer, such as EPDM and EPM, as the main components or by partial crosslinking of these rubbers in the process of the blending. The olefinic thermoplastic elastomers have been urged to bring them to practical applications as the material to replace polyvinyl chloride resins because they have advantages of no environmental problems, lower specific gravity and better property for recycling.

Particularly when the olefinic thermoplastic elastomers are used as interior materials of automobiles, processes after the T-die extrusion and the calendering can be made much simpler than the processes using polyvinyl chloride resins. Olefinic thermoplastic elastomers are very often used for instrument panels, doors and ceilings because of this reason.

In the olefinic thermoplastic elastomers, relatively large amounts of various additives, such as a process stabilizer, a lubricant, an antioxidant, a light stabilizer, a light absorbent and the like, are compounded for the purpose of enhancing workability and durability of the molded products.

Because large amounts of additives are compounded into the olefinic thermoplastic elastomers, the additives frequently bloom out with passage of time after films and sheets prepared from the olefinic thermoplastic elastomers are formed into final products.

In the olefinic thermoplastic elastomers, additives are compounded in considerably larger amounts than in conventional polypropylene resins and the like for improvement of workability and properties in end-use applications. A large amount of an amorphous component, such as EPM and EPDM, and a mineral oil plasticizer are also compounded in the elastomer in addition to polypropylene. The phenomenon of blooming is caused by these reasons. The blooming of the additives leads to undesirable phenomena, such as unsightly appearance of the products, inferior printing in a later process, poor adhesion and the like, and troubles occur in subsequent processing from these phenomena.

SUMMARY OF THE INVENTION

The present invention accordingly has an object to provide an olefinic thermoplastic elastomer composition having the improved property to prevent blooming even when various additives are compounded in it.

Extensive investigations undertaken by the present inventors with the object described above lead to a discovery that an olefinic thermoplastic elastomer composition comprising esters of polyhydric alcohols, alkylalkanolamines and the like compounded into it has the excellent property of preventing blooming after the elastomer is formed into molded products. The present invention has been completed on the basis of the discovery.

Thus, the present invention provides an olefinic thermoplastic elastomer composition having an improved property to prevent blooming comprising an olefinic thermoplastic elastomer containing additives and one or more compounds selected from the group consisting of esters of polyhydric alcohols, alkylalkanolamines, alkylalkanolamides, fatty acid amides, higher alcohols, aliphatic amines, fatty acids and adducts of alkylene oxides to these compounds which are compounded into the olefinic thermoplastic elastomer.

Other and further objects, features and advantages of the invention will appear more fully from the following description.

DETAILED DESCRIPTION OF THE INVENTION

Examples of the olefinic thermoplastic elastomer comprised in the composition of the invention are graft copolymers of polyethylene and butyl rubber, ethylene-propylene copolymer rubbers, ethylene-propylene-polyene copolymer rubbers, thermoplastic resin compositions obtained by dynamic heat treatment of blends of polyolefin resins and ethylene-α-olefin copolymer rubbers (for example, Japanese Patent Publication 1978-34210 and Laid Open Japanese Patent Applications 1978-149240 and 1978-149241), thermoplastic compositions obtained by blending polyolefin resins to thermoplastic resin compositions obtained by dynamic heat treatment of blends of polyolefin resins and ethylene-α-olefin copolymer rubbers (for example, Laid Open Japanese Patent Applications 1978-145857 and 1979-16554) and thermoplastic compositions obtained by dynamic heat treatment of blends of polyolefin resins which are not crosslinked with peroxides and ethylene-α-olefin copolymer rubbers (for example, Laid Open Japanese Patent Application 1980-71739).

Olefinic thermoplastic elastomer molding compositions typically contain additives which often cause blooming, such as antioxidants like phenol antioxidants, process stabilizers, lubricants, light stabilizers and the like.

The olefinic thermoplastic elastomer occasionally contains linear low density polyethylene (LLDPE), low density polyethylene, high density polyethylene, polypropylene and the like for the purpose of improving surface hardness, tensile strength and texture.

Other examples of the additives contained in the olefinic thermoplastic elastomer are conventional pigments, flame retardants, inorganic fillers like tarc, clay and calcium carbonate and the like.

Examples of the ester of polyhydric alcohol which is compounded into the olefinic thermoplastic elastomer are glycol esters, such as polyethylene glycol monoesters, polyethylene glycol diesters and the like, glycerine esters, such as monoglycerides, diglycerides and triglycerides, sorbitol esters, adducts of alkylene oxides to these compounds and the like other compounds.

Examples of the alkylalkanolamine which is compounded into the olefinic thermoplastic elastomer are alkylalkanolamines having 8 to 24 carbon atoms, such as dimethyllaurylamine and the like.

Examples of the alkylalkanolamide which is compounded into the olefinic thermoplastic elastomer are alkylalkanolamides having 8 to 24 carbon atoms, such as lauric acid diethanol amide and the like, adduct of alkylene oxides to these compounds and the like other compounds.

Examples of the fatty acid amide which is compounded into the olefinic thermoplastic elastomer are amides of fatty acids having 10 to 22 carbon atoms, such as amides having 8 to 24 carbon atoms like stearic acid amide, lauric acid amide, adducts of alkylene oxides to these compounds and the like other compounds.

Examples of the higher alcohol which is compounded into the olefinic thermoplastic elastomer are alcohols having 8 to 24 carbon atoms, such as stearyl alcohol, lauryl alcohol, adducts of alkylene oxides to these compounds and the like other compounds.

Examples of the aliphatic amine which is compounded into the olefinic thermoplastic elastomer are amines having 8 to 24 carbon atoms, such as stearyl amine, lauryl amine, adducts of alkylene oxides to these compounds and the like other compounds.

Examples of the fatty acid which is compounded into the olefinic thermoplastic elastomer are fatty acids having 8 to 24 carbon atoms, such as stearic acid, lauric acid, adducts of alkylene oxides to these compounds and the like other compounds.

Examples of the alkylene oxide described above are ethylene oxide, propylene oxide and like other compounds.

The aforementioned compounds selected from the group consisting of esters of polyhydric alcohols, alkylalkanolamines, alkylalkanolamides, fatty acid amides, higher alcohols, aliphatic amines, fatty acids and adducts of alkylene oxides to these compounds which are compounded into the olefinic thermoplastic elastomer are sometimes referred as "the blooming preventing agents" in the following descriptions.

The amount of the blooming preventing agent in the composition of the invention is in the range from 0.05 to 5 weight parts per 100 weight parts of the total of the olefinic thermoplastic elastomer in which various kinds of additives including solid additives have already been compounded.

When the blooming preventing agent is compounded to the olefinic thermoplastic elastomer in an amount of more than 5 weight parts, further enhancement of the effect to prevent the blooming cannot be expected while cost of the composition is increased. Thus, an amount more than the specified range is not favorable.

The olefinic thermoplastic elastomer composition of the invention can be obtained by adding the compounding components of specified amounts and then by kneading them in a kneader, such as a Banbury mixer, a co-kneader, an extruder, a biaxial kneader and the like.

For production of molded products from the composition obtained above, a method, such as extrusion molding, injection molding, blow molding, calendering and the like, can be adopted.

To summarize the advantages obtained by the invention, the olefinic thermoplastic elastomer composition of the invention can maintain beautiful appearance of the molded products made from the composition because unlike conventional products the additives in the composition do not bloom on the surface of the molded products. Therefore, the olefinic thermoplastic elastomer composition of the invention can be advantageously used as interior materials of automobiles and materials for electronic instruments.

The invention will be understood more readily with reference to the following examples; however, these examples are intended to illustrate the invention and are not to be construed to limit the scope of the invention.

EXAMPLES 1 TO 7 AND COMPARATIVE EXAMPLES 1 TO 5

An olefinic thermoplastic elastomer and a blooming preventing agent shown in Table 1 were mixed at first by dry blending and then mixed in a biaxial kneader at 180° to 230° C. to obtain an olefinic thermoplastic elastomer composition.

For evaluation of physical properties of the composition thus obtained, the composition was sheet molded by a 65 m/m bent type T-die extruder to obtain a molded product of 600 mm width and 0.6 mm thickness.

For the purpose of easier observation of blooming phenomenon, a carbon black master batch containing 50 weight parts of carbon black per 100 weight parts of low density polyethylene was added to the composition when the composition is molded to the form of sheet.

Sample pieces of 200 mm×200 mm were cut out from the sheet molded in the above and were treated by one of the following two methods: it was left standing for 2 months at the room temperature; or it was treated in a gear oven for 100 hours at 50° C. After the treatment, the surface of the sample sheet was visually observed and the condition of the surface was evaluated according to the following criteria:

○: no change from the original surface was observed.

Δ: blooming was very slightly observed.

x: blooming was clearly observed. The results are shown in Table 1.

TABLE 1

| | olefinic thermoplastic elastomer | | polyolefin resin | | additive | |
|---|---|---|---|---|---|---|
| | kind | wt. part | kind | wt. part | kind | wt. part |
| Example 1 | A | 100 | — | — | — | — |
| Example 2 | B | 100 | — | — | — | — |
| Example 3 | A | 100 | — | — | — | — |
| Example 4 | A | 100 | C | 30 | — | — |
| Example 5 | A | 100 | C | 20 | — | — |
| | | | D | 30 | | |
| Example 6 | A | 100 | — | — | E | 0.3 |
| Example 7 | A | 100 | — | — | F | 0.3 |
| Comparative Example 1 | A | 100 | — | — | — | — |
| Comparative Example 2 | B | 100 | — | — | — | — |
| Comparative Example 3 | A | 100 | C | 30 | — | — |
| Comparative Example 4 | A | 100 | C | 30 | — | — |
| | | | D | 30 | | |
| Comparative Example 5 | A | 100 | — | — | E | 0.3 |

| | blooming preventing agent | | carbon black master batch wt. part | condition of the surface | |
|---|---|---|---|---|---|
| | kind | wt. part | | 2 months room temp. | gear oven 50° C. × 100 hr. |
| Example 1 | G | 0.2 | 2 | ○ | ○ |
| Example 2 | G | 0.5 | 2 | ○ | ○ |
| Example 3 | H | 0.3 | 2 | ○ | ○ |
| Example 4 | H | 0.4 | 2 | ○ | ○ |
| Example 5 | H | 0.5 | 2 | ○ | ○ |
| Example 6 | G | 0.5 | 2 | ○ | ○ |
| Example 7 | G | 0.5 | 2 | ○ | ○ |
| Comparative Example 1 | — | — | 2 | Δ | Δ |
| Comparative Example 2 | — | — | 2 | Δ | x |
| Comparative | — | — | 2 | x | x |

TABLE 1-continued

| | | | | | |
|---|---|---|---|---|---|
| Example 3 | | | | | |
| Comparative Example 4 | — | — | 2 | Δ | Δ |
| Comparative Example 5 | — | — | 2 | x | x |

A) A kind of the olefinic elastomer, Milastomer 8080 ®, a product of Mitsui Sekiyu Kagaku Co., Ltd., MFR 15, Shore A hardness 85.
B) A kind of the olefinic elastomer, Milastomer 5080 ®, a product of Mitsui Sekiyu Kagaku Co., Ltd., MFR 50, Shore A hardness 50.
C) A polyolefin resin, LLDPE, Ultzex 2022L ®, a product of Mitsui Sekiyu Kagaku Co., Ltd., MFR 2.2.
D) A polyolefin resin, PP, Chisso PPF3020 ®, a product of Chisso Co., Ltd., MFR 0.3.
E) A phenolic antioxidant, Ilganox 1010 ®, a product of Chiba Geigy Co.
F) A benzotriazole light absorbent, Chinubin 326 ®, a product of Chiba Geigy Co.
G) A blooming preventing agent, Armostat 310 ®, a product of Lion Co., Ltd.
H) A blooming preventing agent, fatty acid ester of polyhydric alcohol, Miyokol PZ04 ®, a product of Miyoshi Oil & Fat Co., Ltd.

EXAMPLES 8 TO 11

Olefinic thermoplastic elastomer compositions were prepared and evaluated by the same method as in Example 1 to 5 by using the components listed in Table 2. The results are shown in Table 2.

TABLE 2

| | olefinic thermoplastic elastomer A (wt. part) | additive* | | blooming preventing agent | | condition of the surface | |
|---|---|---|---|---|---|---|---|
| | | | | | | 2 mon. | gear oven |
| | | kind | wt. part | kind | wt. pt. | r.t. | 50° C. × 100 hr. |
| Example 8 | 100 | E | 0.3 | 1) | 0.5 | ○ | ○ |
| Example 9 | 100 | E | 0.3 | 2) | 0.5 | ○ | ○ |
| Example 10 | 100 | F | 0.3 | 3) | 0.5 | ○ | ○ |
| Example 11 | 100 | F | 0.3 | 4) | 0.5 | Δ | ○ |

1) stearic acid amide
2) tridecyl alcohol
3) trihexylamine
4) stearic acid
*E and F: the same as in Table 1.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An olefinic thermoplastic elastomer composition comprising (a) an olefinic thermoplastic elastomer, which is a composite material comprising a blend of a hard polyolefinic plastic component and a soft ethylenic elastomer component or said composite material which is partially crosslinked, and which contains an additive which promotes blooming in products formed from the elastomer and (b) an amount effective to prevent such blooming of at least one member of the group consisting of alkylalkanolamines, aliphatic amines and fatty acids, compounded into the olefinic thermoplastic elastomer.

2. A composition of claim 1 wherein the amount of the blooming preventing agent therein is from 0.05 to 5 weight parts per 100 weight parts of the total of the olefinic thermoplastic elastomer containing additives.

3. A composition according to claim 1, wherein the blooming preventing agent is an alkylalkanolamine.

4. A composition according to claim 3, wherein the alkylalkanolamine has from 8 to 24 carbon atoms.

5. A composition according to claim 1, wherein the blooming preventing agent is a fatty acid.

6. A composition according to claim 5, wherein the fatty acid has from 8 to 24 carbon atoms.

7. A composition according to claim 1, wherein the blooming preventing agent is an aliphatic amine.

8. A composition according to claim 7, wherein the aliphatic amine has from 8 to 24 carbon atoms.

9. A composition according to claim 1, wherein the blooming promoting agent is an antioxidant, a process stabilizer, a lubricant or a light stabilizer.

10. A method of inhibiting the bloom which occurs during use in products formed from an olefinic thermoplastic elastomer, which is a composite material comprising a blend of a hard polyolefinic plastic component and a soft ethylenic elastomer component or said composite material which is partially crosslinked, and which is compounded with an additive which promotes blooming in the products, which comprises also compounding into the elastomer prior to forming a product therefrom an amount effective to prevent such blooming of at least one member of the group consisting of alkylalkanolamines, higher alcohols, aliphatic amines and fatty acids.

11. A method according to claim 10, wherein the amount of the bloom-preventing additive is from 0.05 to 5 weight parts per 100 weight parts of the total of the olefinic thermoplastic elastomer containing additives.

12. A method according to claim 10, wherein the blooming preventing agent is a alkylalkanolamine.

13. A method according to claim 10, wherein the blooming preventing agent is a fatty acid.

14. A method according to claim 10, wherein the blooming preventing agent is a higher alcohol.

15. A composition according to claim 1, wherein the olefinic thermoplastic elastomer is selected from the group consisting of:

graft copolymers of polyethylene with butyl rubber, ethylene-propylene copolymer rubbers, or ethylene-propylene-polyene copolymer rubbers;

compositions obtained by dynamic heat treatment of blends of polyolefin resins and ethylene-α-olefin copolymer rubbers;

compositions obtained by blending polyolefin resins with thermoplastic resin compositions obtained by dynamic heat treatment of blends of polyolefin resins and ethylene-α-olefin copolymer rubbers; and compositions obtained by dynamic heat treatment of blends of polyolefin resins which are not crosslinked with peroxides and ethylene-α-olefin copolymer rubbers.

16. The method of claim 13, wherein the olefinic thermoplastic elastomer is selected from the group consisting of:

graft copolymers of polyethylene with butyl rubber, ethylene-propylene copolymer rubbers, or ethylene-propylene-polyene copolymer rubbers;

compositions obtained by dynamic heat treatment of blends of polyolefin resins and ethylene-α-olefin copolymer rubbers;

compositions obtained by blending polyolefin resins with thermoplastic resin compositions obtained by dynamic heat treatment of blends of polyolefin resins and ethylene-α-olefin copolymer rubbers; and compositions obtained by dynamic heat treatment of blends of polyolefin resins which are not cross-linked with peroxides and ethylene-α-olefin copolymer rubbers.

17. A method according to claim 10, wherein the blooming preventing agent is an aliphatic amine.

* * * * *